(12) United States Patent
Gatmir-Motahari et al.

(10) Patent No.: US 8,559,956 B1
(45) Date of Patent: Oct. 15, 2013

(54) DETERMINATION OF WIRELESS DEVICE DEPARTURE FROM A FEMTOCELL

(71) Applicant: Sprint Communications Company L.P., Overland Park, KS (US)

(72) Inventors: Sara Gatmir-Motahari, Millbrae, CA (US); Kosol Jintaseranee, San Jose, CA (US); Mark Evans, San Mateo, CA (US); Phyllis J. Reuther

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/666,675

(22) Filed: Nov. 1, 2012

(51) Int. Cl.
*H04W 36/00* (2009.01)
(52) U.S. Cl.
USPC .......................................... 455/436; 370/252
(58) Field of Classification Search
USPC ................ 455/435.1, 436, 561; 370/252, 329
See application file for complete search history.

(56) References Cited

U.S. PATENT DOCUMENTS

| 2009/0042536 | A1 | 2/2009 | Bernard et al. | |
| 2010/0267386 | A1* | 10/2010 | Lim et al. | 455/436 |
| 2012/0201159 | A1* | 8/2012 | Morita et al. | 370/252 |

* cited by examiner

*Primary Examiner* — Phuoc Doan

(57) ABSTRACT

Embodiments disclosed herein provide systems and methods for determining whether a wireless device has departed a femtocell. In a particular embodiment, a method provides determining one or more wireless devices that are registered with a wireless femtocell and are not currently exchanging communications with the wireless femtocell. If a control signal from at least one wireless base station is available, the method provides receiving the control signal and processing the control signal to determine whether a portion of the wireless devices are registered with the at least one wireless base station. The method further provides indicating that the portion of the wireless devices registered with the at least one wireless base station are no longer registered with the wireless femtocell.

20 Claims, 6 Drawing Sheets

---

DETERMINE REGISTERED WIRELESS DEVICES NOT CURRENTLY EXCHANGING COMMUNICATIONS WITH FEMTOCELL 105
200

↓

IF AVAILABLE, RECEIVE A CONTROL SIGNAL FROM A WIRELESS BASE STATION
202

↓

PROCESS CONTROL SIGNAL TO DETERMINE A PORTION OF THE WIRELESS DEVICES REGISTERED WITH THE BASE STATION
204

↓

INDICATE THAT THE PORTION OF THE WIRELESS DEVICES ARE NO LONGER REGISTERED WITH FEMTO CELL 105
206

DETERMINATION OF WIRELESS DEVICE DEPARTURE FROM A FEMTOCELL

TECHNICAL BACKGROUND

Wireless communication networks use base stations to exchange communications with wireless communication devices. To supplement these base stations, some wireless networks allow femtocells. Femtocells use the same protocols to communicate with wireless devices as do the regular network base stations but typically cover a smaller area and connect to the wireless network over communication means other than a typical backhaul link. This allows wireless devices within range of a femtocell to exchange communications with the femtocell in the same way the wireless devices would communicate with a regular network base station.

However, since femtocells are not connected to a wireless network using the typical backhaul means, a femtocell is not aware when a wireless device transfers to another base station from the femtocell. Therefore, the femtocell cannot distinguish between an inactive device that is simply not exchanging communications and a device that has left the coverage area of the femtocell to communicate with another base station.

OVERVIEW

Embodiments disclosed herein provide systems and methods for determining whether a wireless device has departed a femtocell. In a particular embodiment, a method provides determining one or more wireless devices that are registered with a wireless femtocell and are not currently exchanging communications with the wireless femtocell. If a control signal from at least one wireless base station is available, the method provides receiving the control signal and processing the control signal to determine whether a portion of the wireless devices are registered with the at least one wireless base station. The method further provides indicating that the portion of the wireless devices registered with the at least one wireless base station are no longer registered with the wireless femtocell.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
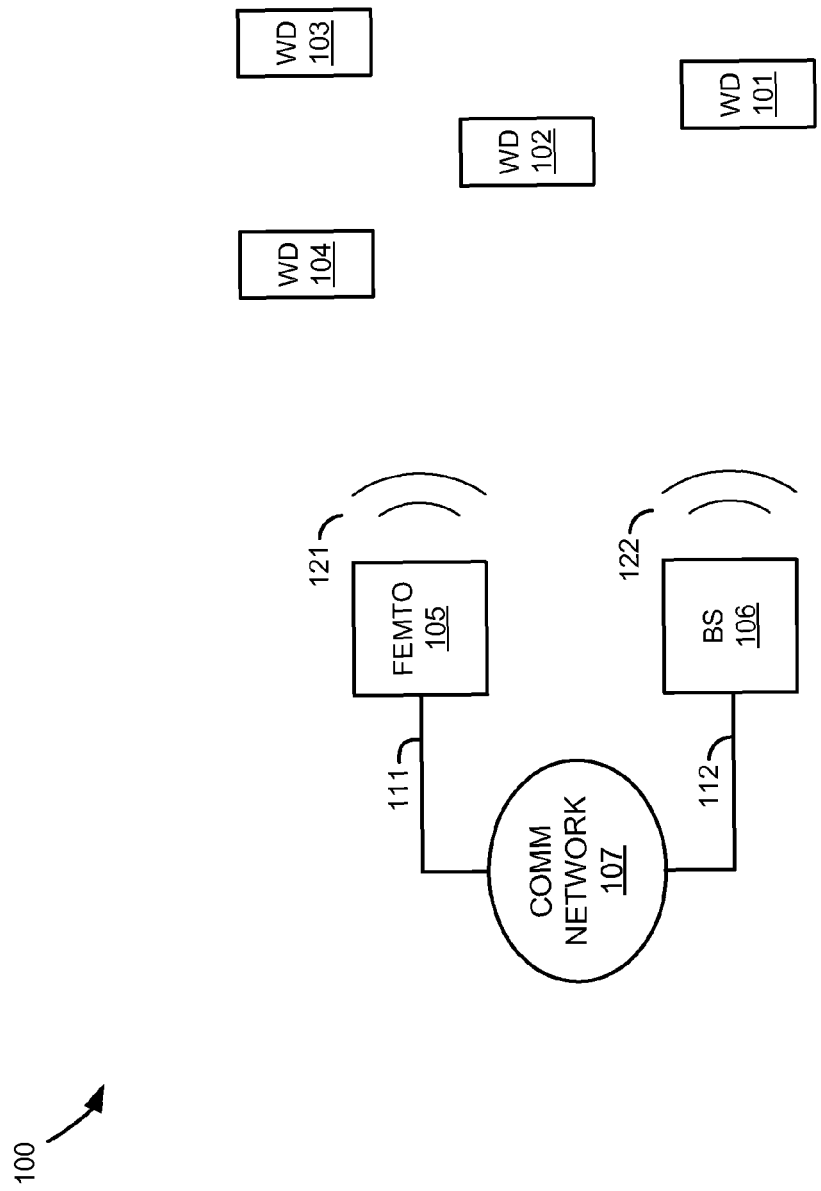
FIG. 1 illustrates a wireless communication system for determining whether a wireless device has departed a femtocell.

FIG. 1 illustrates wireless communication system 100. Wireless communication system 100 includes wireless communication devices 101-104, wireless femtocell 105, wireless base station 106, and communication network 107. Wireless communication devices 101-104 and wireless femtocell 105 communicate over wireless links within wireless sector 121. Wireless communication devices 101-104 and wireless base station 106 communicate over wireless links within wireless sector 122. Wireless femtocell 105 and communication network 107 communicate over communication link 111. Wireless base station 106 and communication network 107 communicate over communication link 112.

In operation, wireless devices 101-104 communicate with other wireless devices, application service systems, the Internet, and other types of communication systems via communication network 107. Femtocell 105 and base station 106 both provide wireless devices 101-104 with access to communication network 107. Typically, a femtocell has a shorter wireless signal range than a base station, though communicates with wireless devices using the same protocols as a base station. For example, wireless sector 122 of base station 106 may be capable of reaching many miles from base station 106 depending on other limiting factors, such as natural barriers or man made barriers, while wireless sector 121 of femtocell 105 may only reach a distance of tens or hundreds of feet. The coverage area of base station 106 may overlap or envelope the coverage area of femtocell 105.

In some cases, even though femtocell 105 uses the same protocols as base station 106 to communicate with wireless devices 101-104, femtocell 105 may not participate in registration update communications with base station 106 or other base stations on communication network 107. For example, femtocell 105 may communicate with communication network 107 through different means than base station 106, such as via the Internet, which does not allow femtocell 105 to stay apprised of wireless device registrations with other base stations. Accordingly, femtocell 105 may not recognize when any of wireless devices 101-104 leave wireless sector 121 because femtocell 105 is unable to recognize whether a wireless device has left wireless sector 121 to register with another base station or is merely dormant.

Figure 2:
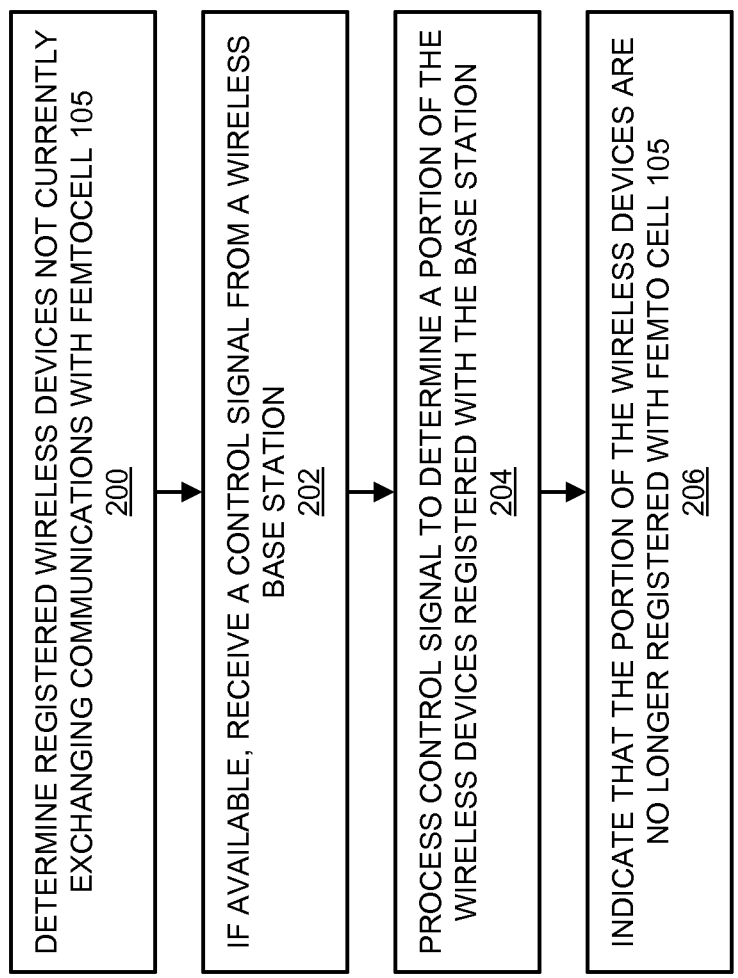
FIG. 2 illustrates the operation of the wireless communication system for determining whether a wireless device has departed a femtocell.

FIG. 2 illustrates the operation of wireless communication system 100 for determining whether a wireless device has departed a femtocell. The method determines one or more wireless devices that are registered with wireless femtocell 105 and are not currently exchanging communications with wireless femtocell 105 (step 200). In this example, wireless devices 101-104 are registered with femtocell 105. A wireless device may register with femtocell 105 upon receiving a pilot signal from femtocell 105 and determining that femtocell 105 is best suited to provide the wireless device with wireless communication service. When registered with femtocell 105, wireless devices 101-104 may exchange control signaling over control channels and exchange traffic over traffic channels.

However, while registered with femtocell 105, wireless devices 101-104 may not always be exchanging communications with femtocell 105. Time periods when no signaling occurs between a wireless device and femtocell 105 may simply indicate that the wireless device is not exchanging communications during that time. For example, one of the time periods may occur when no application, such as phone, messaging, web browsing, social networking, or any other type of application, running on a wireless device is receiving or sending communications. During such time periods at least the radio of the wireless device that exchanges communications with femtocell 105 may be considered dormant.

Alternatively, a time period where no signaling occurs may indicate that the wireless device 101 is now communicating with another base station, such as base station 106. Femtocell 105 may not know when a wireless device registers and communicates with another base station since femtocell 105 does not communicate with communication network 107 through the same means as traditional base stations. For example, femtocell 105 does not communicate with communication network 107 through the use of base station controllers and mobile switching centers, as do other base stations.

A particular wireless device may be determined as not currently communicating with femtocell 105 if the wireless device is not exchanging communications at the time the determination is made, if the wireless device is does not exchange communications during a time window for the determination, if the wireless device has not exchanged communications for a predetermined amount of time, or by some other means for determining that a wireless device has become dormant. In some embodiments, such as those where a wireless device is not currently communicating with femtocell 105 if the wireless device has not exchanged communications for a predetermined amount of time, the determination of step 200 may be a continuous process where a wireless device is identified as soon as that predetermined amount of time has elapsed. Alternatively, the determination of step 200 may be made periodically and identifies any wireless devices that have not exchanged communications for longer than the predetermined period of time.

If a control signal from at least one wireless base station is available for receipt by femtocell 105, femtocell 105 receives the control signal (step 202). In this example, femtocell 105 receives a control signal from at least base station 106. The control signal from base station 106 contains information for connected wireless devices to communicate with communication network 107. The control signal may include a paging signal, pilot signal, digital rate control signal, or any other type of control signal on a wireless communication network—including combinations thereof.

The control signals from the at least one base station are processed to determine whether a portion of wireless devices 301-304 are registered with the at least one wireless base station (step 204). Included in the control signal information are device identifiers for wireless devices communicating with the base station. For example, if wireless device 102 is registered to communicate with base station 106, then the control signal from base station 106 will include a device identifier for wireless device 102 when control communications are directed at wireless device 102. A wireless identifier is any type of identifier for a wireless device that would remain constant for that device regardless of which base station is communicating with the wireless device. Thus, a wireless identifier in the control signal would be associated with the same wireless device that used that wireless identifier to communicate with femtocell 105. The control signal may be continually monitored to ensure that a wireless identifier is not missed due to communication inactivity by the device associated with the wireless identifier.

The portion of the wireless devices registered with the at least one wireless base station are then indicated as no longer registered with wireless femtocell (step 206). The indication may include removing the portion of the wireless devices from a list, or other type of data structure, that keeps track of the wireless devices registered with femtocell 105. With the portion of the wireless devices removed from the list of registered devices, femtocell 105 no longer needs to operate as though the portion of the wireless devices will exchange communications with femtocell 105. At a later point, one or more of the wireless devices in the portion may reregister with femtocell 105 in order to again exchange communications with femtocell 105. Additionally, the indication may indicate to femtocell 105 or some other system that tracks wireless device movement on communication network 107 or tracks device registration information for some other purpose. This may allow for the derivation of information related to movement patterns on communication network 107. Femtocell 105 may further indicate that the portion of wireless devices 101-104 that are not registered with the at least one base station are inactive, or dormant, devices.

In an example of the above process, at step 200 it is determined that all of wireless devices 101-104 are not currently exchanging communications with femtocell 105. Femtocell 105 receives the control signal from base station 106 and processes the control signal to determine that the wireless identifiers for wireless devices 102 and 103 are in the control signal. Accordingly, wireless devices 102 and wireless device 103 are indicated as no longer being registered with femtocell 105.

The process described above may be executed in femtocell 105 or within a different communication processing system external to femtocell 105, located within communication network 107, or elsewhere. Likewise, the functionality may be divided among multiple systems. For example, femtocell 105 may perform steps 200-204 and then provide the indication of step 206 to another system for further processing.

Additionally, in some embodiments, the steps 202 and 204 may be performed continually by femtocell 105 so that femtocell 105 is always aware of the wireless devices that are registered with the at least one base stations. Therefore, once it is determined that a wireless device is not currently exchanging communications with femtocell 105 at step 200, femtocell 105 may have already determined that the identifier for that wireless device is registered with another base station. Similarly, in some embodiments, femtocell 105 stores the wireless identifiers received from the control signals and, if a wireless device having one of the wireless device identifiers registers with femtocell 105, femtocell 105 indicates that the wireless device came from one of the at least one wireless base stations. This functionality provides additional information for analysis of wireless device movement.

Referring back to FIG. 1, wireless communication devices 101-104 each comprise Radio Frequency (RF) communication circuitry and an antenna. The RF communication circuitry typically includes an amplifier, filter, modulator, and signal processing circuitry. Wireless communication devices 101-104 may also include a user interface, memory device, software, processing circuitry, or some other communication components. Each of wireless communication devices 101-104 may be a telephone, computer, e-book, mobile Internet appliance, wireless network interface card, media player, game console, or some other wireless communication apparatus—including combinations thereof.

Femtocell 105 comprises RF communication circuitry and an antenna. The RF communication circuitry typically includes an amplifier, filter, RF modulator, and signal processing circuitry. Femtocell 105 may also comprise a router, server, memory device, software, processing circuitry, cabling, power supply, network communication interface, structural support, or some other communication apparatus. Though shown as directly connected to communication network 107, femtocell 105 may communicate with communication network 107 through other networks and systems, such as the Internet.

Base station 106 comprises RF communication circuitry and an antenna. The RF communication circuitry typically includes an amplifier, filter, RF modulator, and signal processing circuitry. Base station 106 may also comprise a router, server, memory device, software, processing circuitry, cabling, power supply, network communication interface, structural support, or some other communication apparatus. Although base station 106 and femtocell 105 include similar components, base station 106 typically, but not necessarily, services a larger wireless coverage area than does femtocell 105.

Communication network 107 comprises network elements that provide communications services to wireless devices 101-104 through femtocell 105 and base station 106. Communication network 107 may comprise switches, wireless access nodes, Internet routers, network gateways, application servers, computer systems, communication links, or some other type of communication equipment—including combinations thereof.

Wireless sectors 121 and 122 include wireless links that use the air or space as the transport media. The wireless links may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 111-112 use metal, glass, air, space, or some other material as the transport media. Communication links 111-112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-112 could be direct links or may include intermediate networks, systems, or devices.

Figure 3:
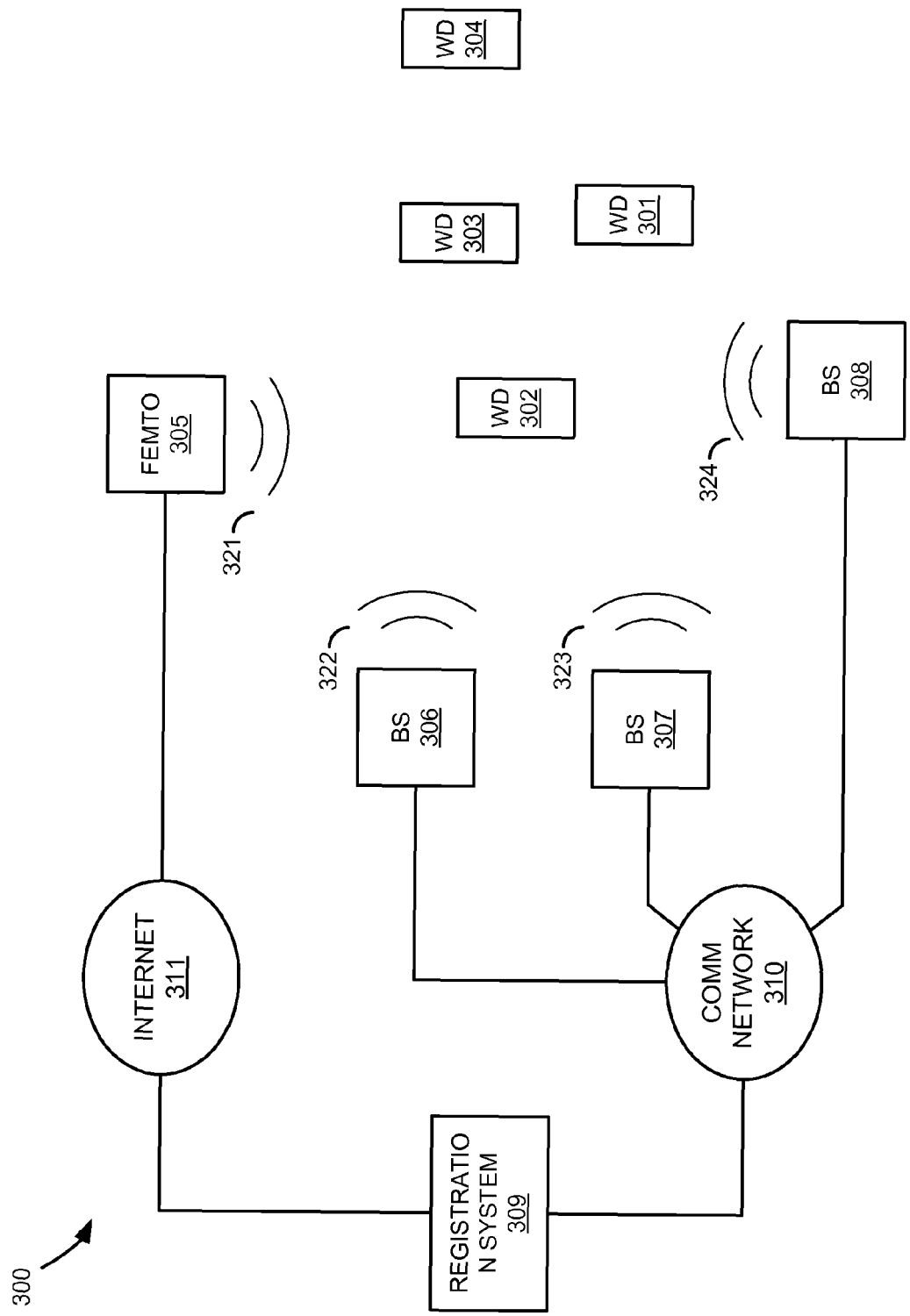
FIG. 3 illustrates a wireless communication system for determining whether a wireless device has departed a femtocell.

FIG. 3 illustrates wireless communication system 300. Wireless communication system 300 includes wireless communication devices 301-304, wireless femtocell 305, wireless base stations 306-308, registration system 309, communication network 310, and Internet 311. Wireless communication devices 301-304 and wireless femtocell 305 communicate over wireless links within wireless sector 321. Wireless communication devices 301-304 and wireless base station 306 communicate over wireless links within wireless sector 322. Wireless communication devices 301-304 and wireless base station 307 communicate over wireless links within wireless sector 323. Wireless communication devices 301-304 and wireless base station 308 communicate over wireless links within wireless sector 324. Though not shown, Internet 311 may communicate with communication network 310 without routing communications through registration system 309.

In operation, wireless devices 301-304 are capable of communicating with femtocell 105 and base stations 306-308 when within the coverage areas of base stations 306-308. The locations of femtocell 305 and base stations 306-308 are not necessarily drawn accurately relative to one another. For example, base stations 306-308 may surround femtocell 305 at varying distances and locations so that femtocell 305 may be able to receive control signals from each of base stations 306-308. In particular, femtocell 305 may service a single family home while base stations 306-308 service the neighborhood of that home.

Femtocell 105 may be used due to poor coverage from base stations 306-308 at the location of femtocell 105, to reduce communication load on base stations 306-308, or for any other reason. Femtocell 105 provides at least some of the communications services offered by communication network 310 through Internet 311 and may access Internet 311 through Internet access networks, such as cable or DSL. However, since femtocell 305 communicates with communication network 310 through Internet 311, femtocell 305 in not aware of when wireless devices depart the coverage area of femtocell 305 to the coverage areas of any of base stations 306-308.

Figure 4:
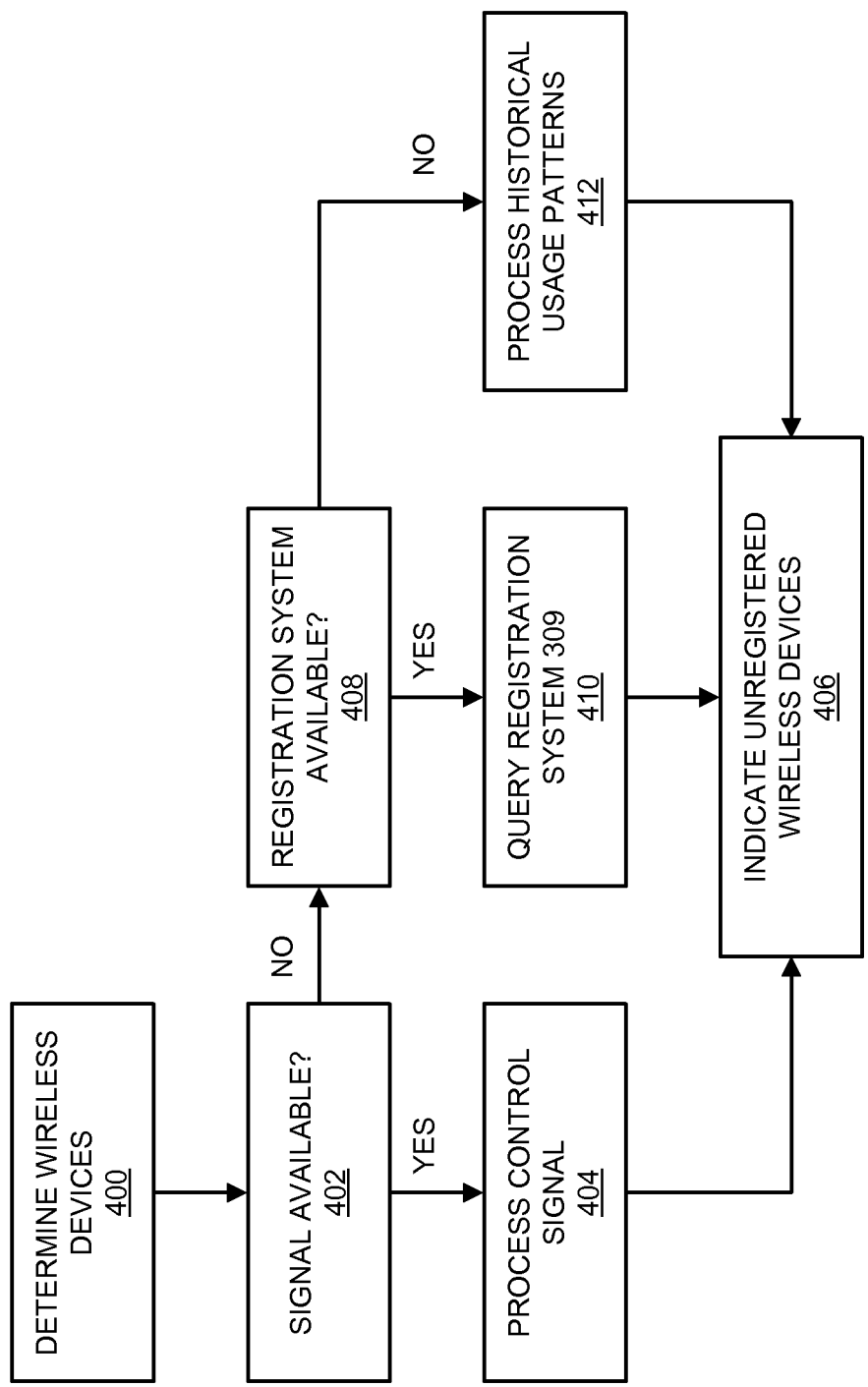
FIG. 4 illustrates the operation of the wireless communication system for determining whether a wireless device has departed a femtocell.

FIG. 4 illustrates the operation of wireless communication system 300 for determining whether a wireless device has departed a femtocell. Femtocell 305 determines that wireless devices 301-304 have not exchanged communications with femtocell within a predetermined period of time even though the devices are registered with femtocell 305 (step 400). Wireless devices 301-304 each used a unique wireless identifier to register and communicate with femtocell 305. The same unique wireless identifiers are used by wireless devices 301-304 to register with all base stations or femtocells.

To determine whether wireless devices 301-304 have left the coverage area of femtocell 305, femtocell 305 determines whether control signals for other base stations can be received by femtocell 305 (step 402). The control signals may be received by femtocell 305 in the same manner in which they are received by one of wireless devices 301-304. For example, femtocell 305 may be able to receive pilot signals from one or more of base stations 306-308 and use the information in those pilot signals to identify and read control channels for the base stations.

If one or more control signals are available for receipt by femtocell 305, then femtocell 305 processes the control signals (step 404). When processing the control signal, femtocell 305 identifies wireless device identifiers enumerated in each control signal. Each control signal may use the wireless identifiers to direct control traffic to connected wireless devices and femtocell 305 recognizes the identifiers in that control traffic. Once the wireless device identifiers are received by femtocell 305, femtocell 305 compares the received identifiers to the wireless identifiers of wireless devices 301-304. If a received identifier matches the identifier of one of wireless devices 301-304, then that wireless device has moved from the coverage of femtocell 305 to the base station from which the identifier was received.

After determining whether the identifiers for any of wireless devices 301-304 are included in the control signals from base stations 301-304, femtocell 305 indicates that the devices included in the control signals are no longer registered with femtocell 305 (step 406). Femtocell 305 may also store information about which base station to which a wireless device moved for further analysis.

Referring back to step 402, if no control signals are available for receipt by femtocell 305, then femtocell 305 determines whether femtocell 305 can query registration system 309 for registration information (step 408). Registration system may be an authentication, authorization, and accounting (AAA) system for communication network 310 or may be some other type of registration system. A control signal may not be available to femtocell 305 because femtocell 305 is located outside the coverage areas of base stations 306-308 or control signals from base stations 306-308 are otherwise prevented from being received at femtocell 305. Femtocell 305 may be preprogramed with an address for registration system 309 or may request an address of registration system 309 to query registration system 309 for availability.

If registration system 309 is available, femtocell 305 transfers a message to registration system 309 to query registration system 309 about wireless devices 301-304 (step 410). The message may include the wireless device identifiers for wireless devices 301-304 so that registration system 309 can compare the identifiers with wireless device identifiers registered with base stations 306-308 and other base stations on communication network 310. If any of the wireless device identifiers match, then registration system 309 transfers a response message indicating the matching identifiers. Registration system 309 may also indicate to which base station a matching wireless device identifier was registered.

After determining whether the identifiers for any of wireless devices 301-304 are registered with other base stations, femtocell 305 indicates that the devices registered with other base stations are no longer registered with femtocell 305 (step 406). Femtocell 305 may also store information about which base station to which a wireless device moved for further analysis. In some embodiments, even if femtocell 305 can receive control signals from one or more of base stations 306-308, femtocell 305 may still query registration system 309 to ensure one of wireless devices 301-304 did not move to a base station with a control signal that femtocell 305 cannot receive.

Referring back to step 408, if registration system 309 is unavailable, then femtocell 305 processes historical usage patterns for wireless devices 301-304 (step 412). Registration system 309 may be unavailable because femtocell 305 does not have an address for registration system 309, registration system 309 may not allow a query from femtocell 309, registration system 309 may not be capable of supporting queries from femtocell 305, or for any other reason. The historical usage patterns may be determined from femtocell 305 based on past movement characteristics of wireless devices 301-304. The movement characteristics may be determined based on information recorded by femtocell during previous iterations of the method steps in FIG. 4. For example, whenever femtocell 305 determines that a wireless device has departed the coverage area of femtocell 305, femtocell 305 may indicate a time at which the departure determination was made. If that wireless device shows a historical pattern of departing around a particular time of day and the current time is within that time of day, then femtocell 305 may determine that the wireless device has departed.

After analyzing the historical usage patterns, femtocell 305 indicates that that any devices with historical usage patterns consistent with the departure from femtocell 305 are no longer registered with femtocell 305 (step 406).

Figure 5:
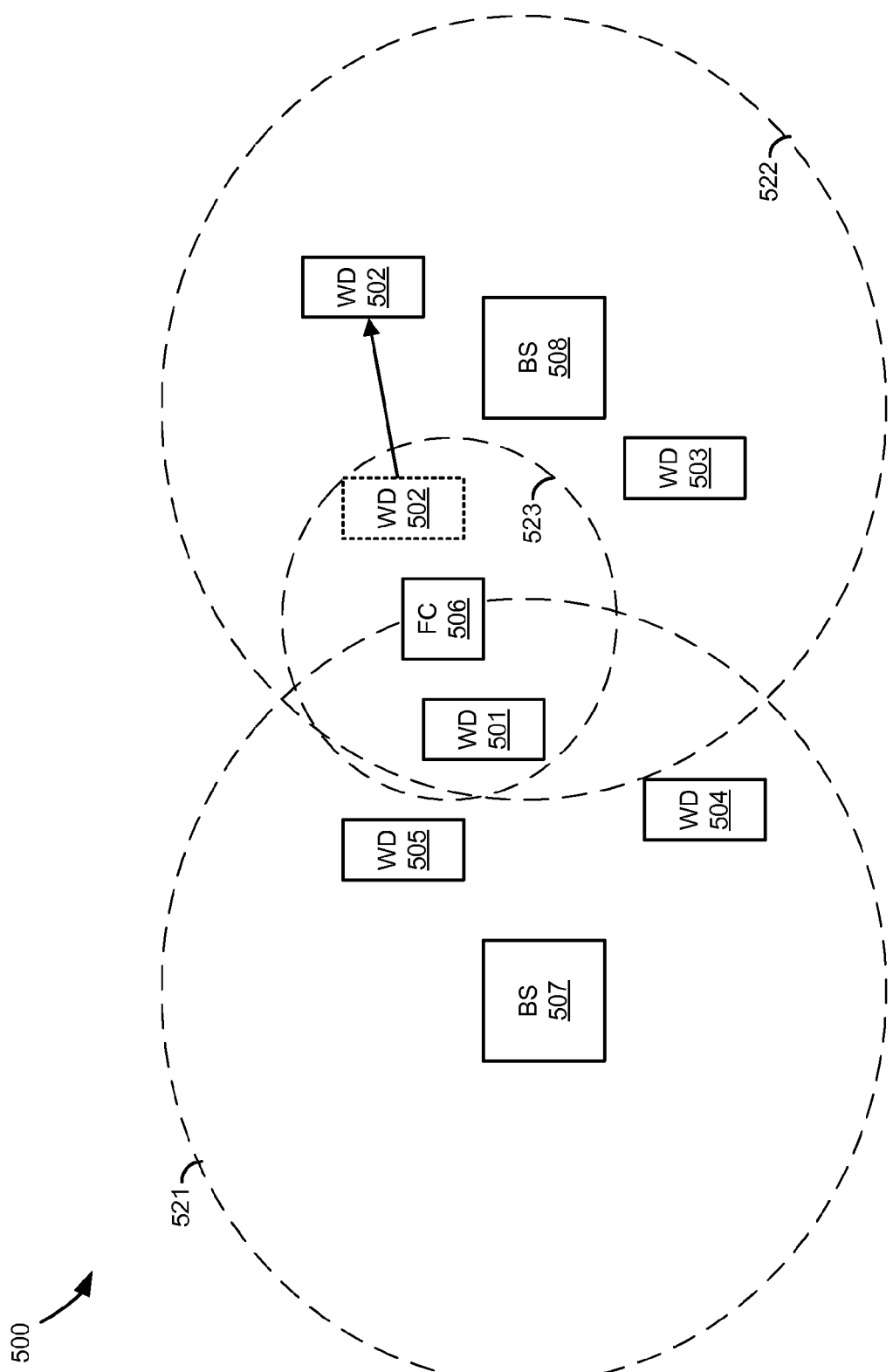
FIG. 5 illustrates a wireless communication system for determining whether a wireless device has departed a femtocell.

FIG. 5 illustrates the operation of wireless communication system 500 for determining whether a wireless device has departed a femtocell. Wireless communication system 500 includes wireless communication devices 501-505, femtocell 506, and base stations 507 and 508. Base station 507 provides wireless communication service to wireless coverage area 521. Base station 508 provides wireless communication service to wireless coverage area 522. Femtocell 506 provides wireless communication service to wireless coverage area 523. Coverage areas 521-523 are meant to illustrate overlapping coverage areas in an exemplary embodiment. While the size and shape of coverage areas 521-523 is displayed as circular, the size and shape may vary.

In operation, femtocell 506 determines that wireless devices 501 and 502 are both registered to exchange communications with femtocell 506 but are not currently exchanging communications. In order to determine whether either of the wireless devices has registered to exchange communications with other base stations, femtocell 506 receives control signals from both base station 507 and 508 since femtocell 506 is located within coverage areas 521 and 522.

Upon receiving the control signals, femtocell 506 recognizes two wireless identifiers for wireless devices registered with base station 507. The two identifiers correspond to wireless devices 504 and 505, though femtocell 506 does not receive any further information about wireless devices 504 and 505 beyond the identifiers. Likewise, femtocell 506 recognized two identifiers for wireless devices registered with base station 508. Those two identifiers correspond to wireless devices 502 and 503, though femtocell 506 does not receive any further information about wireless devices 502 and 503 beyond the identifiers.

Femtocell 506 then compares the four wireless device identifiers from the two control signals to the wireless identifiers that wireless devices 501 and 502 used to register and communicate with femtocell 506. Femtocell 506 determines that one of the identifiers from base station 508 matches the identifier for wireless device 502 but none match the identifier for wireless device 501. Therefore, femtocell 506 indicates that wireless device 502 is no longer registered for communications with femtocell 506 and indicates that wireless device 501 is inactive but remains registered.

While the preceding embodiment illustrates that wireless device 502 moved outside of coverage area 523 to cause registration with base station 508, wireless device 502 may register with base station 508 for other reasons. For example, an error in communication signaling may cause wireless device 502 to select base station 508 over femtocell 506 to exchange communications.

Figure 6:
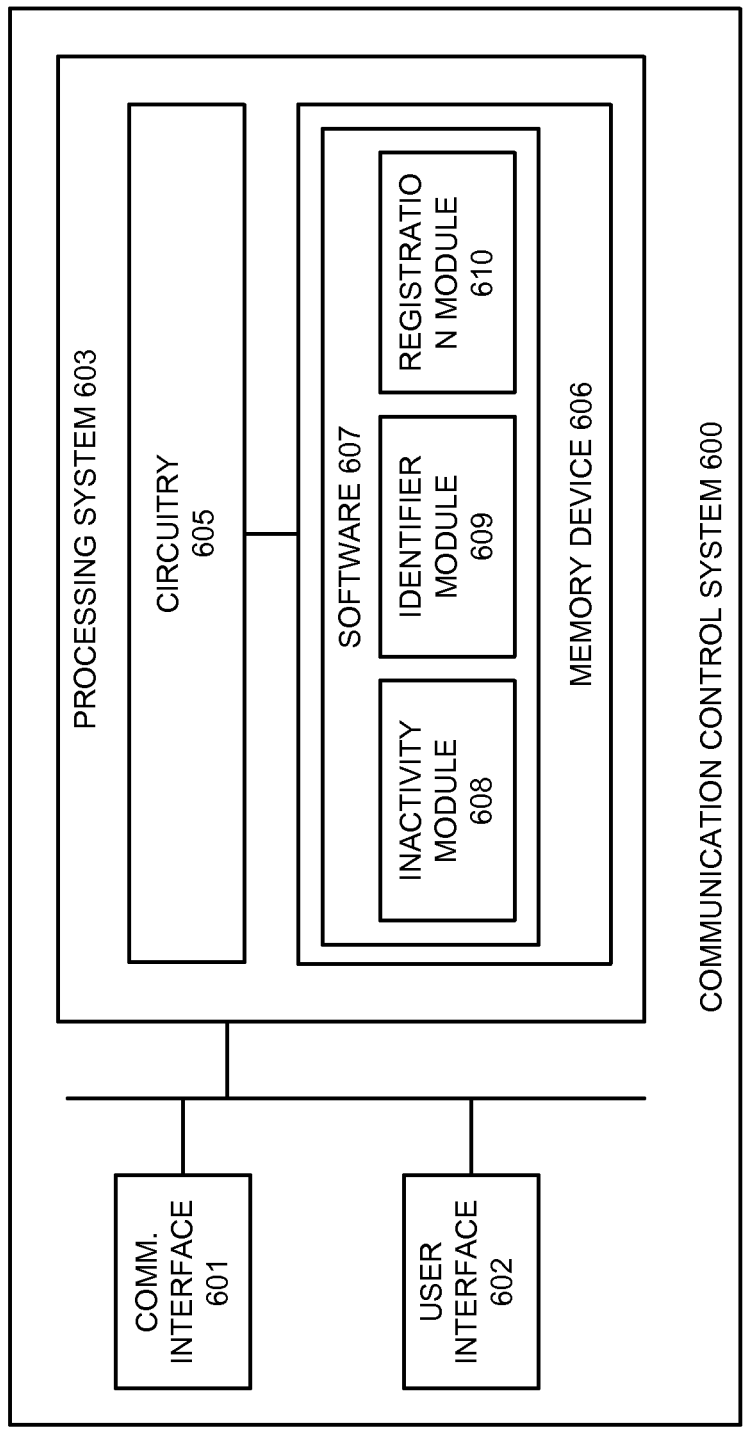
FIG. 6 illustrates a communication processing system for determining whether a wireless device has departed a femtocell.

FIG. 6 illustrates communication control system 600. Communication control system 600 is an example of femtocell 105, although femtocell 105 may use alternative configurations. Communication control system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus.

Operating software 607 comprises computer programs, firmware, or some other form of machine-readable processing instructions. Operating software 607 includes inactivity module 608, identifier module 609, and registration module 610. Operating software 607 may further include an operating system, utilities, drivers, network interfaces, applications, or some other type of software. When executed by circuitry 605, operating software 607 directs processing system 603 to operate communication control system 600 as described herein.

In particular, inactivity module 608 directs processing system 603 to determine one or more wireless devices that are registered with a wireless femtocell and are not currently exchanging communications with the wireless femtocell. If a control signal from at least one wireless base station is available, identifier module 609 directs processing system 603 receive the control signal via communication interface 601 and process the control signal to determine whether a portion of the wireless devices are registered with the at least one wireless base station. Registration module 610 directs processing system 603 to indicate that the portion of the wireless devices registered with the at least one wireless base station are no longer registered with the wireless femtocell.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
   determining one or more wireless devices that are registered with a wireless femtocell and are not currently exchanging communications with the wireless femtocell;
   if a control signal from at least one wireless base station is available, receiving the control signal;
   processing the control signal to determine whether a portion of the wireless devices are registered with the at least one wireless base station; and
   indicating that the portion of the wireless devices registered with the at least one wireless base station are no longer registered with the wireless femtocell.

2. The method of claim 1, further comprising:
   if the control signal is not available, transferring a message to a registration system for a wireless communication network of the at least one wireless base station, wherein the message indicates the wireless devices;
   receiving a response message from the registration system indicating the portion of the wireless devices registered with the at least one wireless base station.

3. The method of claim 2, wherein the registration system determines whether any device identifiers indicated in the message match device identifiers registered with the at least one wireless base station.

4. The method of claim 2, further comprising:
   if the registration system is unavailable, determining the portion of the wireless devices registered with the at least one wireless base station based on historical usage patterns for the wireless devices.

5. The method of claim 4, wherein the historical usage patterns indicate past time periods when a wireless device has departed the coverage area of the wireless femtocell.

6. The method of claim 1, wherein processing the control signal comprises:
   determining whether any device identifiers enumerated in the control signal match device identifiers for the wireless devices.

7. The method of claim 1, further comprising:
   indicating that a second portion of the wireless devices that are not registered with the at least one wireless base station are inactive devices.

8. The method of claim 1, further comprising:
   storing wireless device identifiers enumerated in the control signal;
   if a wireless device having one of the wireless device identifiers registers with the wireless femtocell, indicating that the wireless device came from one of the at least one wireless base stations.

9. The method of claim 1, wherein the wireless femtocell accesses the Internet through a communication network other than a wireless communication network of the at least one base station.

10. The method of claim 1, wherein determining the one or more wireless devices that are registered with a wireless femtocell and are not currently exchanging communications with the wireless femtocell comprises:
    determining whether the one or more wireless devices have not exchanged communications with the wireless femtocell for a predetermined period of time.

11. A wireless communication system, comprising:
    a processing system configured to determine one or more wireless devices that are registered with a wireless femtocell and are not currently exchanging communications with the wireless femtocell;
    a communication interface configured to, if a control signal from at least one wireless base station is available, receive the control signal; and
    the processing system further configured to process the control signal to determine whether a portion of the wireless devices are registered with the at least one wireless base station and indicate that the portion of the wireless devices registered with the at least one wireless base station are no longer registered with the wireless femtocell.

12. The wireless communication system of claim 11, wherein:
    the communication interface is further configured to, if the control signal is not available, transfer a message to a registration system for a wireless communication network of the at least one wireless base station, wherein the message indicates the wireless devices and receive a response message from the registration system indicating the portion of the wireless devices registered with the at least one wireless base station.

13. The wireless communication system of claim 12, wherein the registration system determines whether any device identifiers indicated in the message match device identifiers registered with the at least one wireless base station.

14. The wireless communication system of claim 12, further comprising:
    the processing system configured to, if the registration system is unavailable, determine the portion of the wireless devices registered with the at least one wireless base station based on historical usage patterns for the wireless devices.

15. The wireless communication system of claim 14, wherein the historical usage patterns indicate past time periods when a wireless device has departed the coverage area of the wireless femtocell.

16. The wireless communication system of claim 11, wherein the processing system is configured to processes the control signal to determine whether any device identifiers enumerated in the control signal match device identifiers for the wireless devices.

17. The wireless communication system of claim 11, wherein the processing system is further configured to indicate that a second portion of the wireless devices that are not registered with the at least one wireless base station are inactive devices.

18. The wireless communication system of claim 11, further comprising:
- a storage system configured to store wireless device identifiers enumerated in the control signal; and
- the processing system further configured to, if a wireless device having one of the wireless device identifiers registers with the wireless femtocell, indicate that the wireless device came from one of the at least one wireless base stations.

19. The wireless communication system of claim 11, wherein the wireless femtocell accesses the Internet through a communication network other than a wireless communication network of the at least one base station.

20. The wireless communication system of claim 11, wherein the processing system is configured to determine whether the one or more wireless devices have not exchanged communications with the wireless femtocell for a predetermined period of time to determine the one or more wireless devices that are registered with a wireless femtocell and are not currently exchanging communications with the wireless femtocell.

* * * * *